US012699203B2

(12) United States Patent (10) Patent No.: US 12,699,203 B2
Schultz (45) Date of Patent: Aug. 4, 2026

(54) WET BULB GLOBE TEMPERATURE SYSTEM

(71) Applicant: Zelusports, LLC, Columbia, MO (US)

(72) Inventor: Scott Schultz, Columbia, MO (US)

(73) Assignee: Zelusports, LLC, Columbia, MO (US)

( * ) Notice: Subject to any disclaimer, the term of this patent is extended or adjusted under 35 U.S.C. 154(b) by 343 days.

(21) Appl. No.: 18/208,268

(22) Filed: Jun. 10, 2023

(65) Prior Publication Data

US 2024/0248236 A1 Jul. 25, 2024

(51) Int. Cl.
*G01W 1/06* (2006.01)
*G01W 1/10* (2006.01)

(52) U.S. Cl.
CPC ................ *G01W 1/06* (2013.01); *G01W 1/10* (2013.01); *G01W 2203/00* (2013.01)

(58) Field of Classification Search
CPC ........... G01W 1/06; G01W 1/10; G01W 1/02; G01W 2203/00
See application file for complete search history.

(56) References Cited

U.S. PATENT DOCUMENTS

| | | | | |
|---|---|---|---|---|
| 2009/0198112 A1* | 8/2009 | Park | ................... | A61B 5/02438 |
| | | | | 600/301 |
| 2015/0337745 A1* | 11/2015 | MacNeille | .............. | F02D 37/02 |
| | | | | 123/406.48 |
| 2016/0018835 A1* | 1/2016 | Gaasch | ..................... | G05F 1/66 |
| | | | | 700/291 |
| 2017/0206772 A1* | 7/2017 | Klimanis | ............... | H04B 11/00 |
| 2018/0137735 A1* | 5/2018 | Matsuoka | ............. | A61B 5/1112 |
| 2019/0289772 A1* | 9/2019 | Murphy | .............. | G05D 1/0094 |
| 2021/0264346 A1* | 8/2021 | Momayez | ................ | G06N 3/09 |
| 2022/0365245 A1* | 11/2022 | Kano | ...................... | G01W 1/17 |

FOREIGN PATENT DOCUMENTS

| | | | | | |
|---|---|---|---|---|---|
| JP | 2013210167 A | * | 10/2013 | ................ | F24F 1/42 |
| JP | 2013220236 A | * | 10/2013 | .............. | A61B 5/00 |
| JP | 2019045987 A | * | 3/2019 | ............. | G08B 21/02 |

* cited by examiner

*Primary Examiner* — Lal Ce Mang
(74) *Attorney, Agent, or Firm* — Brett M. Maland

(57) ABSTRACT
The invention described herein is a method and device for determining critical weather characteristics. In the preferred embodiment, the invention relates to methods and devices for determining, displaying, and recording the wet bulb globe temperature. The wet bulb globe temperature is critical for predicting health events such as heat exhaustion and heat stroke and other heat ailments.

20 Claims, 9 Drawing Sheets

Server + WBGT detail

WET BULB GLOBE TEMPERATURE SYSTEM

CROSS REFERENCE TO RELATED APPLICATION

This application claims priority to U.S. Provisional Patent App. No. 63/351,375 titled Wet Bulb Globe Temperature System filed Jun. 11, 2022.

FIELD

This invention relates to the field of weather software and devices.

BACKGROUND

Activity undertaken in high temperatures can cause health issues. The key indicator however, it not temperature alone. Instead, the key indicator for a person's susceptibility to health conditions caused by overheating is the wet bulb globe temperature. Disclosed herein is a device and method, and various embodiments thereof, for determining the wet bulb globe temperature in a way that is useful for various activities, such as high school sports activities.

SUMMARY

Disclosed herein is an innovative computer implemented system for correlating a wet bulb globe temperature to a user specified location at a user specified time. In one embodiment, the computer implemented system is comprised of 1) a positioning module configured to determine a physical location of a user; 2) an electronic data feed source of weather data for the physical location or a secondary location; 3) a processor configured to determine an ambient wet bulb globe temperature for the physical location or the secondary location based on the weather data; 4) a user interface module configured to display the ambient wet bulb globe temperature and to enable a user to select a wet bulb globe temperature limit; 5) a memory module configured to assign a time stamp and a location stamp to the ambient wet bulb globe temperature and to save the ambient wet bulb globe temperature having the time stamp and the location stamp; a wireless communication module; 6) and an alert module configured to alert the user when the ambient wet bulb globe temperature meets or exceeds the wet bulb globe temperature limit for a location. The secondary location can be selected from a map, menu or other displays and the secondary location can be a plurality of selected locations.

The positioning module is preferably GPS or the global positioning system. However, other positioning methods such as wifi triangulation, radar triangulation, including new ones invented in the future, are within the bounds of this invention.

The electronic data feed source includes weather data for a given location. Various sources provide weather data from anywhere in the world. The data can be fed continuously or intermittently. The data should be taken at least every 5 minutes but preferably at least once per minute when used for continuous monitoring.

The weather data is used to estimate a wet globe temperature and a black globe temperature and the processor performs the estimates. The wet bulb globe temperature is based on the wet globe temperature, the black globe temperature, and the air temperature.

The memory module records specified wet bulb globe temperatures and these are time stamped and location stamped. Such data can be used for investigations into heat related incidents as it can be important to know what the wet bulb globe temperature was during athletic events such as a marathon, for example.

The alert module can release an alert by using sound, vibration, light, messaging, emailing or any combination or other methods known in the art now or in the future. The alert module can also be useful in athletic events and trainings. For example, a coach might receive an alert during a hot summer football practice and know that the coach should take action to prevent heat related injuries.

In another embodiment of the computer implemented system, the user interface module is further configured to display a temperature for the physical location.

In another embodiment of the computer implemented system, the processor is further configured to determine a forecasted wet bulb globe temperature for the physical location or the secondary location. Whether the physical location or the secondary location is used can be determined by a user.

In another embodiment of the computer implemented system, the processor is further configured to determine and/or store a historical wet bulb globe temperature for the physical location or the secondary location.

In another embodiment of the computer implemented system, the wireless communication module is configured to send an email to a specified email address, the email including the ambient wet bulb globe temperature having the time stamp and the location stamp. This provides an alternative means of saving the data.

In another embodiment of the computer implemented system, the system also has a server, wherein the wireless communication module is configured to send the physical location or the secondary location to a remote server, the remote server includes the processor.

In another embodiment of the computer implemented system, the remote server is configured to receive the weather data.

In another embodiment of the computer implemented system, the weather data is comprised of relative humidity, air temperature, dew point, wind speed, solar irradiance, zenith angle, barometric pressure, and cloud cover.

In another embodiment of the computer implemented system, the weather data is used to determine a wet globe temperature and a black globe temperature, the wet globe temperature and the black globe temperature being used to determine the ambient wet bulb globe temperature.

In another embodiment of the computer implemented system, the wet globe temperature, the black globe temperature and the air temperature are the variables used to calculate the ambient wet bulb globe temperature.

Also disclosed herein is a mobile/server system for determining a wet bulb globe temperature comprising: 1) a portable unit and 2) a remote server, the portable unit comprising 1i) a thermometer configured to determine an air temperature; 1ii) a positioning module configured to determine a physical location of a user; 1iii) a user interface configured to display a wet bulb globe temperature for the physical location; 1iv) a wireless communication module configured to communicate with the remove server; 2) the remote server comprising 2i) an electronic data feed source configured to receive weather data for the physical location; 2ii) a processor configured to determine the wet bulb globe temperature for the physical location based on the weather data and the air temperature; 2iii) a memory module configured to assign a time stamp and a location stamp to the wet bulb globe temperature and to save the wet bulb globe temperature having the time stamp and the location stamp; and 2iv) a wireless communication component configured to communicate with the portable unit.

The portable unit must have a thermometer that can take accurate air temperature measurements and can provide a digital output.

The positioning model is preferably GPS, but can be any other form of positioning module, including those not yet invented.

The user interface allows a user to select a location, including the location of the user using location provided by the positioning module. The user interface also allows a user to select an alert limit, such that when a weather parameter meets or exceeds the selected limit, then an alert is issued warning the user regarding the weather parameter. It is an object of this invention to provide the wet bulb globe temperature, at it is the most important indicator of heat risk to humans who are undergoing some sort of work or exercise. The user interface also displays various weather parameters, such as the wet bulb globe temperature.

The wireless communication module on the portable unit sends the user selected inputs and/or the location and the air temperature to a server to determine the wet bulb globe temperature based on the air temperature and other weather data.

That other weather data is received by the server and includes important parameters that allow the wet bulb globe temperature to be determined. The weather data can come from a variety of sources using APIs. A processor determines the wet bulb globe temperature based on the weather data received. A memory module records the wet bulb globe temperatures at specified times and locations. The communication component sends the user selected wet bulb globe temperatures back to the portable unit for display on the interface.

In another embodiment of the mobile/server system, the portable unit further comprises an alert module having a wet bulb globe temperature limit and configured to create an alert when the wet bulb globe temperature is equal to or exceeds the wet bulb globe temperature limit.

In another embodiment of the mobile/server system, the user interface includes an alert limit that allows a user to select the wet bulb globe temperature limit.

In another embodiment of the mobile/server system, the user interface includes a location input configured to enable a user to select a location to be associated with a wet bulb globe temperature.

In another embodiment of the mobile/server system, the processor determines a wet globe temperature and a black globe temperature based on the weather data, and then determines a wet globe bulb temperature based on the wet globe temperature, the black globe temperature, and the air temperature.

In another embodiment of the mobile/server system, the weather data is further comprised of a relative humidity, a dew point, a wind speed, a solar irradiance, a zenith angle, a barometric pressure, and a cloud cover.

Also disclosed herein is a wet bulb globe temperature device comprising: a GPS module configured to establish a location of the device; a communication module configured to receive a wet bulb globe temperature, the wet bulb globe temperature further comprising an ambient wet bulb globe temperature and a forecasted wet bulb globe temperature and transmit the location of the device, a user selected location, and the wet bulb globe temperatures; a customizable user interface configured to receive a wet bulb globe temperature limit, display the ambient wet bulb globe temperature, display the forecasted wet bulb globe temperature; and an alert module configured to alert a user when the ambient wet bulb globe temperature equals or is greater than the wet bulb globe temperature limit.

DETAILED DESCRIPTION OF DRAWINGS

Figure 1:
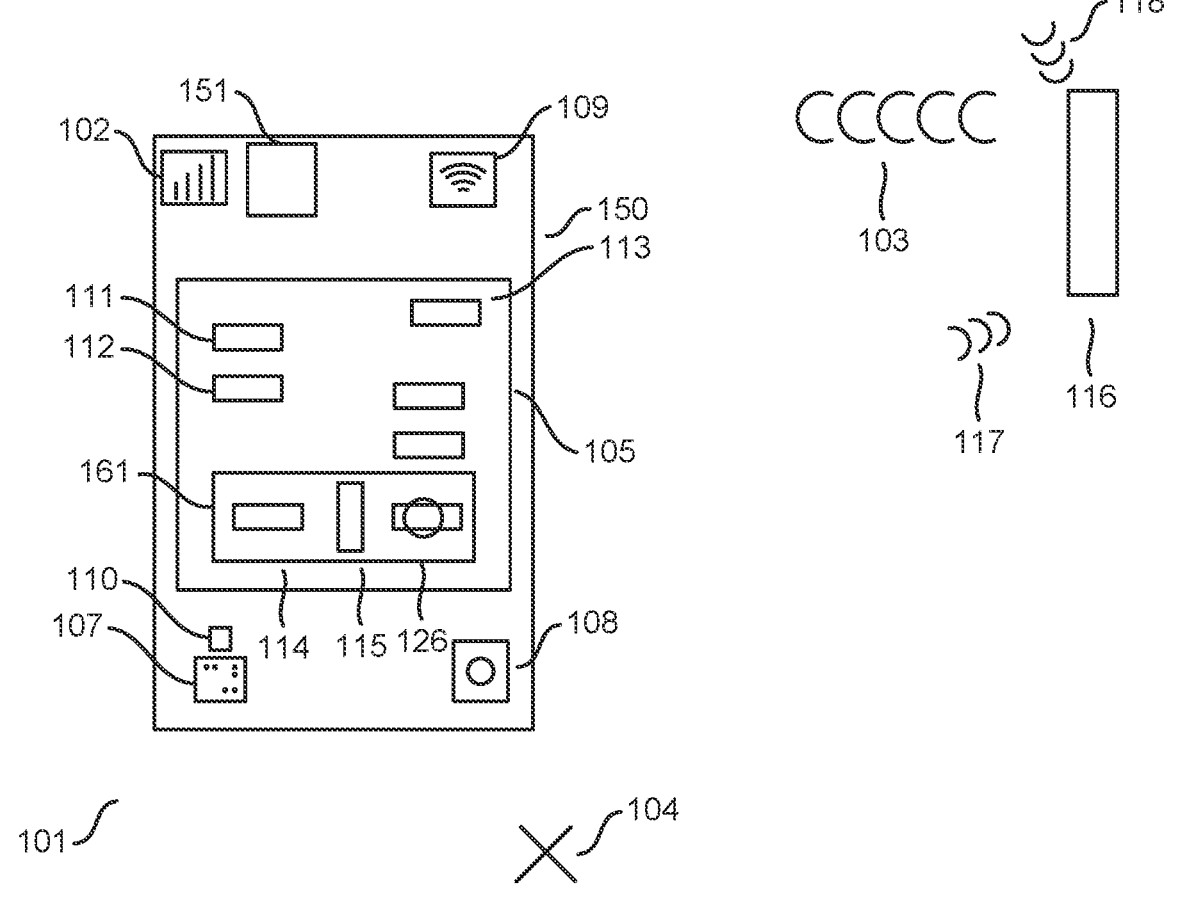
FIG. 1 is a portable device for displaying and recording wet bulb globe temperature.

The technical content of the present invention will become clear by the detailed description of the following embodiments and the illustration of related drawings as follows:

FIG. 1 shows the computer implemented system for determining and using the wet bulb globe temperature. The portable device 101 communicates with a remote server 116. The system is comprised of a positioning module 102, a wireless communication module 109, a memory module 108, a processor 107, and a user interface module 105. The system also includes an electronic data feed source 103 that provides weather data and allows for the wet bulb globe temperature to be determined for a given location at a given time, the weather data comes to the server 116.

The wet bulb globe temperature can be for an ambient wet bulb globe temperature experienced by the user holding the portable device 101 when based on the location of the positioning module 102. The positioning module can be based on GPS. It could also be on other setups as well, such as a mesh network of routers or boosters.

The user interface module 105 is configured to display the wet bulb globe temperature for a given location and given time. The wet bulb globe temperature can be selected by a user on the wet bulb globe temperature selector 161 between a current wet bulb globe temperature 126, a forecasted wet bulb globe temperature 114 or a historical wet bulb globe temperature 115. The user interface has a user selected location element 113 that allows the user to select a location for the wet bulb globe temperature to be known. This can be done by searching a location by name, searching by GPS coordinates, by searching an interactive map, or by speaking into the interface. The selected location element 113 allows the user to select the location of the device 104 or the location of anywhere else in the world which can be displayed on the interface. The user interface module 105 may display the temperature 111 and/or a heat index 112.

The system also includes an alert module 110 that allows a user to select a wet bulb globe temperature limit and the system will trigger an alert when the wet bulb globe temperature at a selected location reaches or exceeds the wet bulb globe temperature limit. The selected location can be the location of the device or a user selected secondary location, which can include a plurality of locations. The alert module is valuable in many contexts. For example, a coach can be alerted to potentially dangerous heat before the heat causes athletes to experience heat related injury. The system can also be programmed to take time into account. So, when the wet bulb globe temperature has been over a dangerous level for 1 hour, then one alert might be sounded, whereas another alert might be sounded if the wet bulb globe temperature gets to a more dangerous wet bulb globe temperature level for just 15 minutes.

The server 116 receives the user specified location 118 and weather data 117 corresponding to the user specified location 118. Using the weather data, the processor within the server determines the wet bulb globe temperature. The air temperature at the user's location can be determined by a thermometer 151 on the portable unit.

Figure 2:
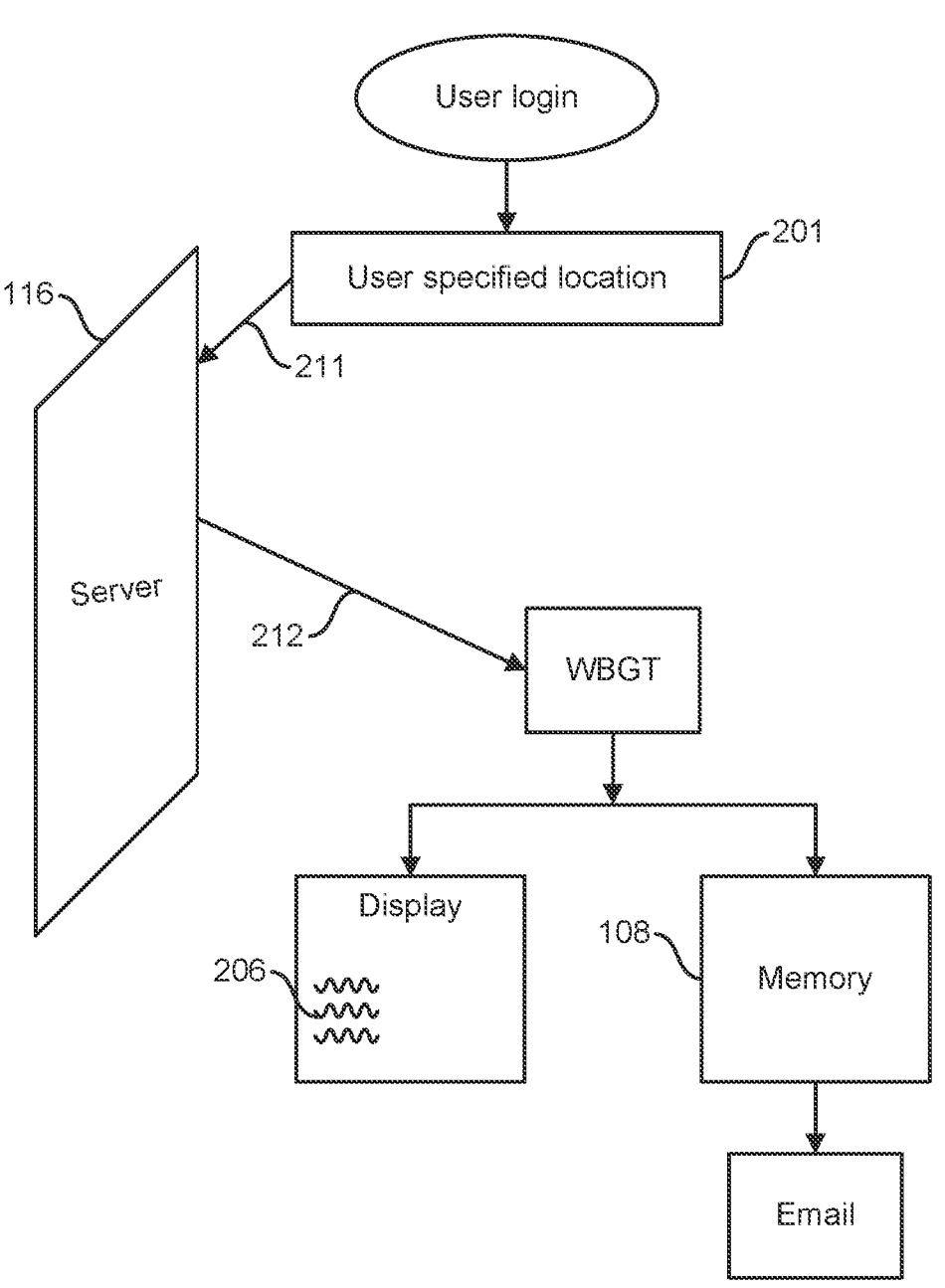
FIG. 2 is a method of calculating, displaying and alerting a user of the wet bulb globe temperature.

The user interface module 105 allows a user to login to begin the wet bulb globe temperature process as shown in FIG. 2. The user is allowed to specify the location 201 for the wet bulb globe temperature. The location data 211 feeds to a server and the server returns a wet bulb globe temperature data signal 212 to the device which displays the data 206 and records the data into memory 108. The data is further emailed for off device storage. The memory 108 is preferably within the server.

Figure 3:
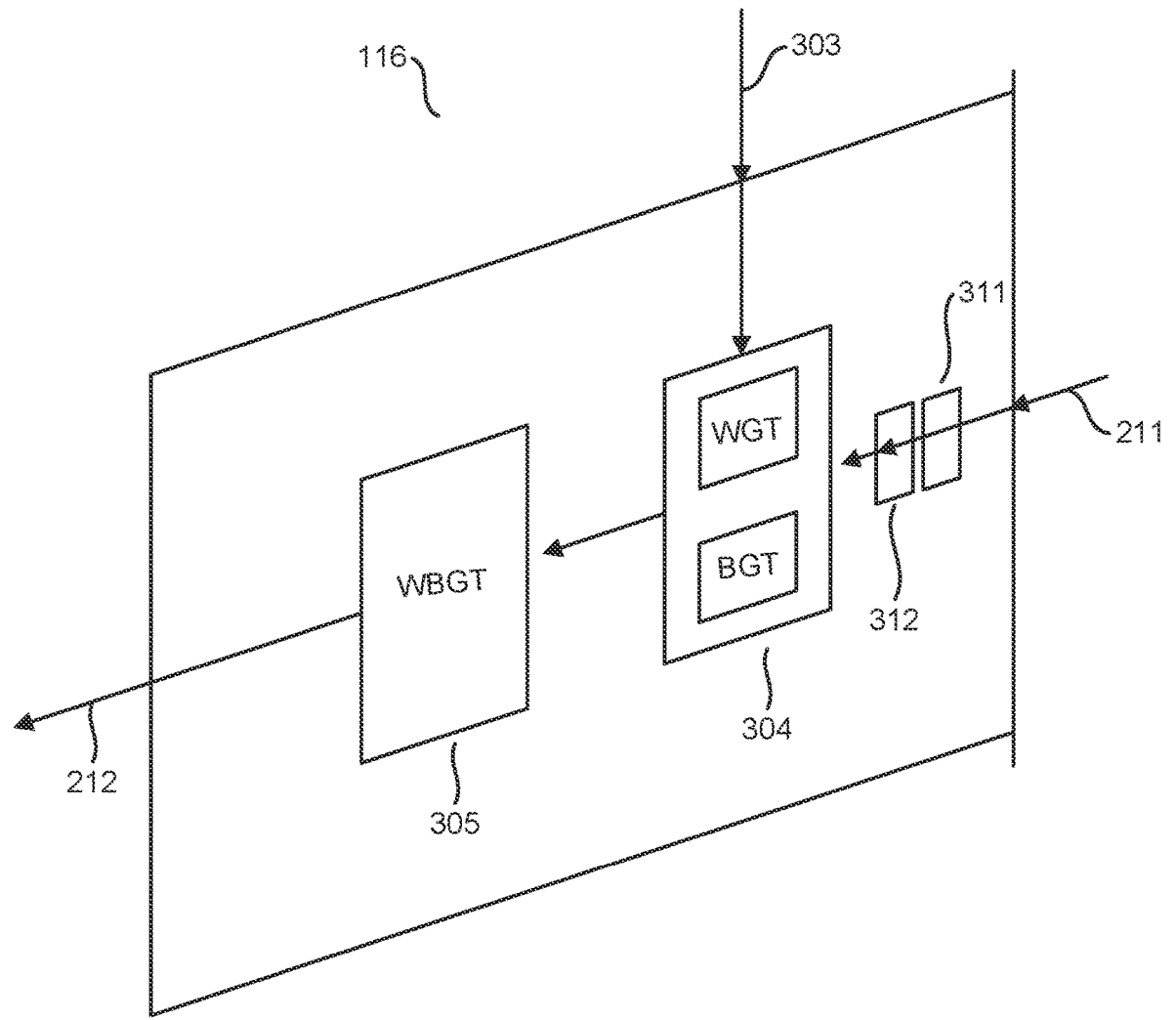
FIG. 3 is a method of calculating the wet bulb globe temperature.

The server 116 is configured to receive user specified location data 211 which is time stamped 311 and location stamped 312 as shown in FIG. 3. Preferably, a unit within the server attaches the time stamp and location stamp to the wet bulb globe temperature that is saved. The server is configured to received weather data 303 associated with the user specified location data 211. The weather data 303 is the relative humidity, the air temperature, the dew point, the wind speed, the solar irradiance, the zenith angle, the barometric pressure and the cloud cover. The wet globe temperature and the black globe temperature are determined from the weather data 303 in a calculating step 304 and the wet bulb globe temperature is estimated based on the wet globe temperature and the black globe temperature in an estimating step 305. The wet bulb globe temperature estimate is sent as wet bulb globe temperature data 212 to the portable device 150.

FIGS. 4-9 show details of the user interface of process that the user can enter into so that the desired data is available, recorded, and/or displayed. In the following disclosure, a step may be referred to as a first step or a second step and so forth. However, this is generally just one embodiment, as a user may often interchange some steps as described herein. A first step 401 is that the user must open the app to log in to the computer implemented method of tracking wet bulb globe temperature if not previously logged in. The user selects a location 402 to identify the wet bulb globe temperature based on the positioning module's input. The user selected location can be the user's location, or another location as specified by GPS coordinates, or other positioning means. The method includes a step 403 for sending the user specified location to a database or application programming interface and receiving API call data that is processed to determine a WGBT. The wet bulb globe temperature is then inserted into the user interface described in FIG. 1 based on an organization selected by the user 405 and displayed 406 if display is selected by the user.

After the wet bulb globe temperature is determined for a selected location, the user may define next steps 407. The user may continue 412 with the monitoring the wet bulb globe temperature at that location in the same way, or might modify the organization 415 of the display. The user interface allows the user to change the location 408, save specified data 409, sent an alert 401, display forecasts of wet bulb globe temperature 411, or recall saved data 414.

Figure 5:
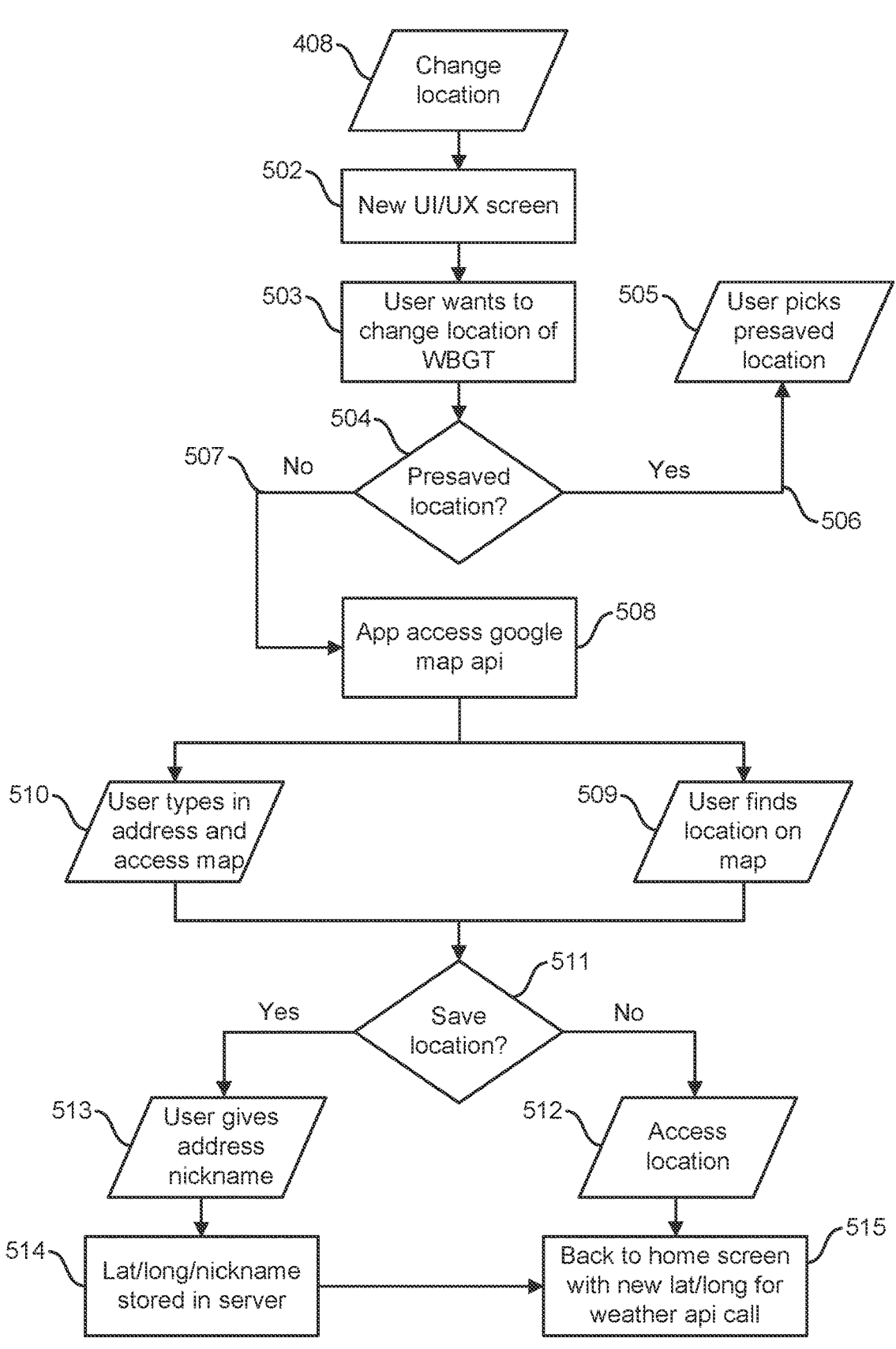
FIG. 5 is a process for selecting a location.

Referring to FIG. 5, if the user changes the location 408, then the user will see a new UI/UX screen 502 to select the location. The user can then select a new location 503. The method then considers whether the location selected is a new location or pre-saved location. If the location is new 507, then the computer implemented method will access a mapping module 508. If it is a pre-saved location 506, then the user will have the option to pick from one of those pre-saved locations with those pre-saved locations displayed 505. When the mapping module 508 is used, the user may select from the map 509 or the user may type in an address or GPS coordinates 510. The user will then be given an opportunity to save the location 511 for later use. If the user selects to save the location, then the user may give the location a nickname in an additional step 513. Then, the location stored in memory 513 and the location is used. If the user does not select to save the location 512, then the location is simply used 512 and the user is directed back to a home screen 515.

Figure 4:
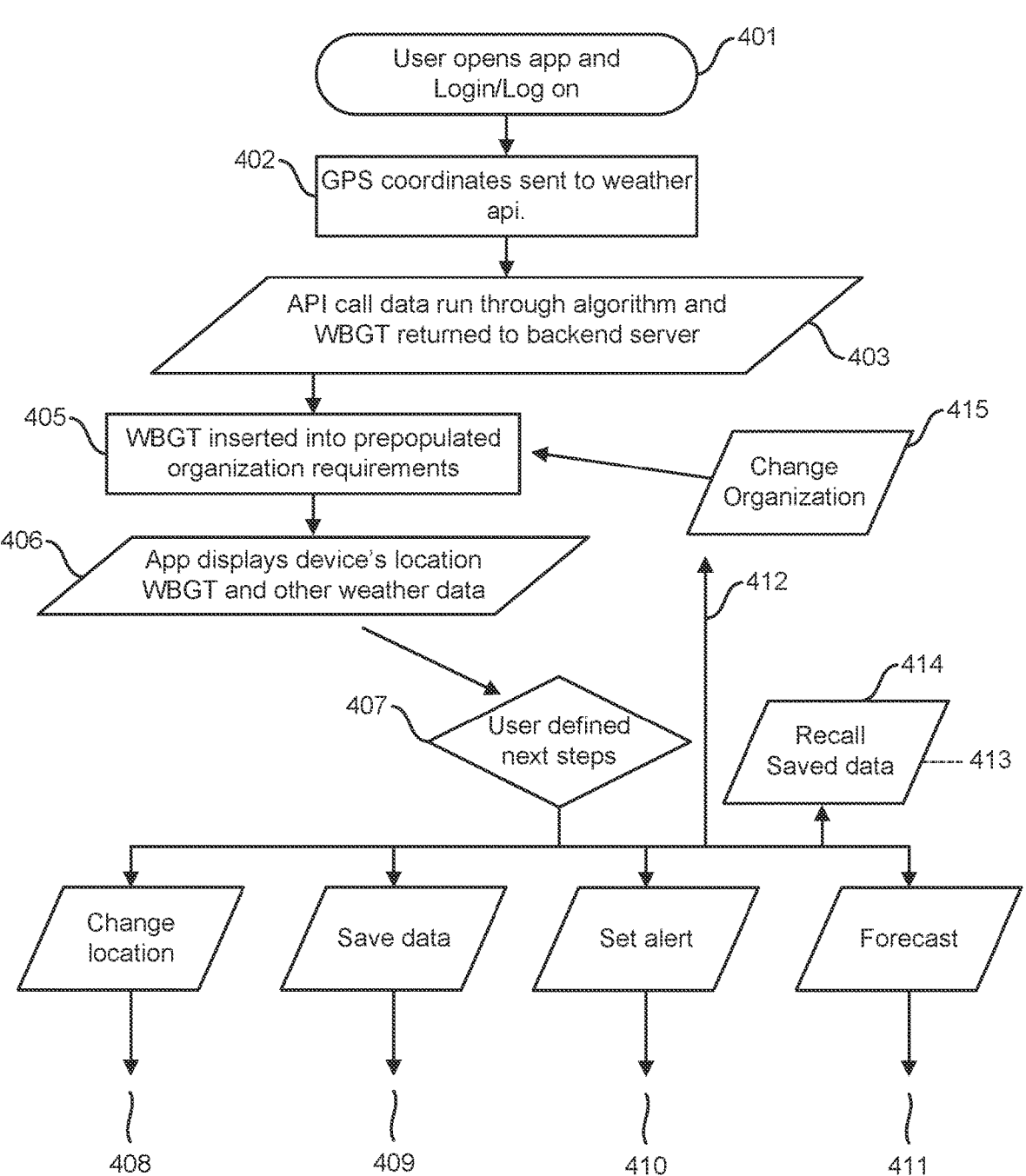
FIG. 4 is a process for the user to select variables.
Figure 6:
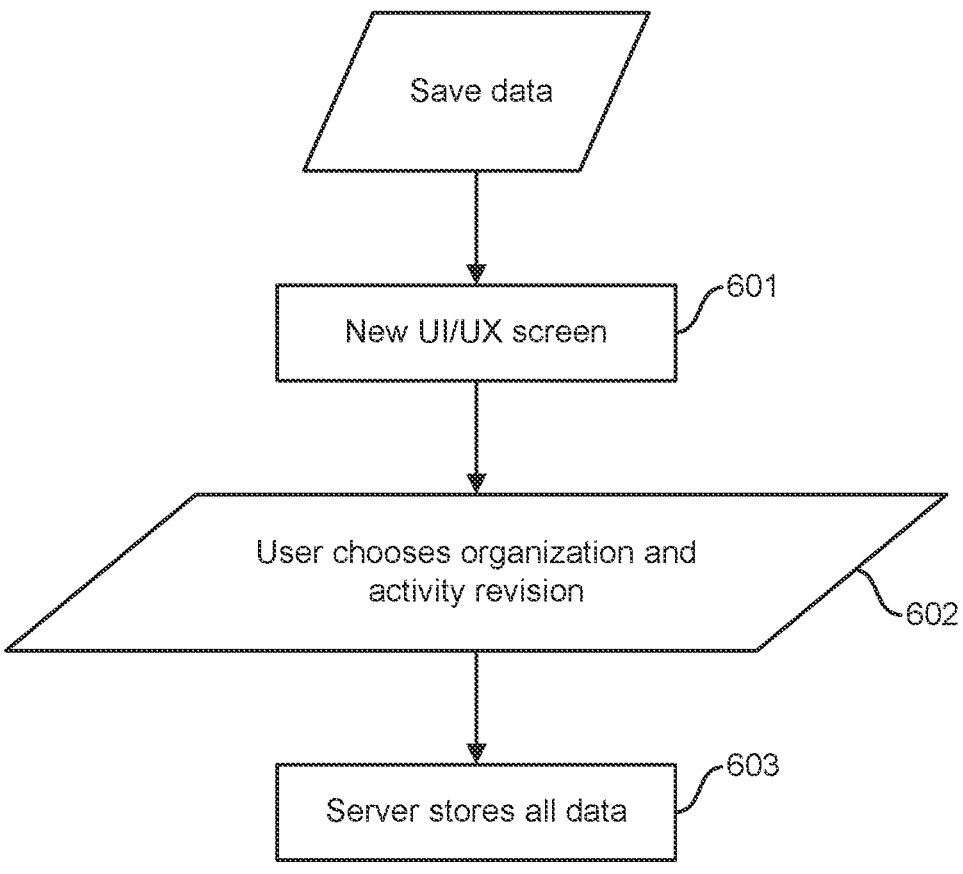
FIG. 6 is a process for saving weather data.
Figure 7:
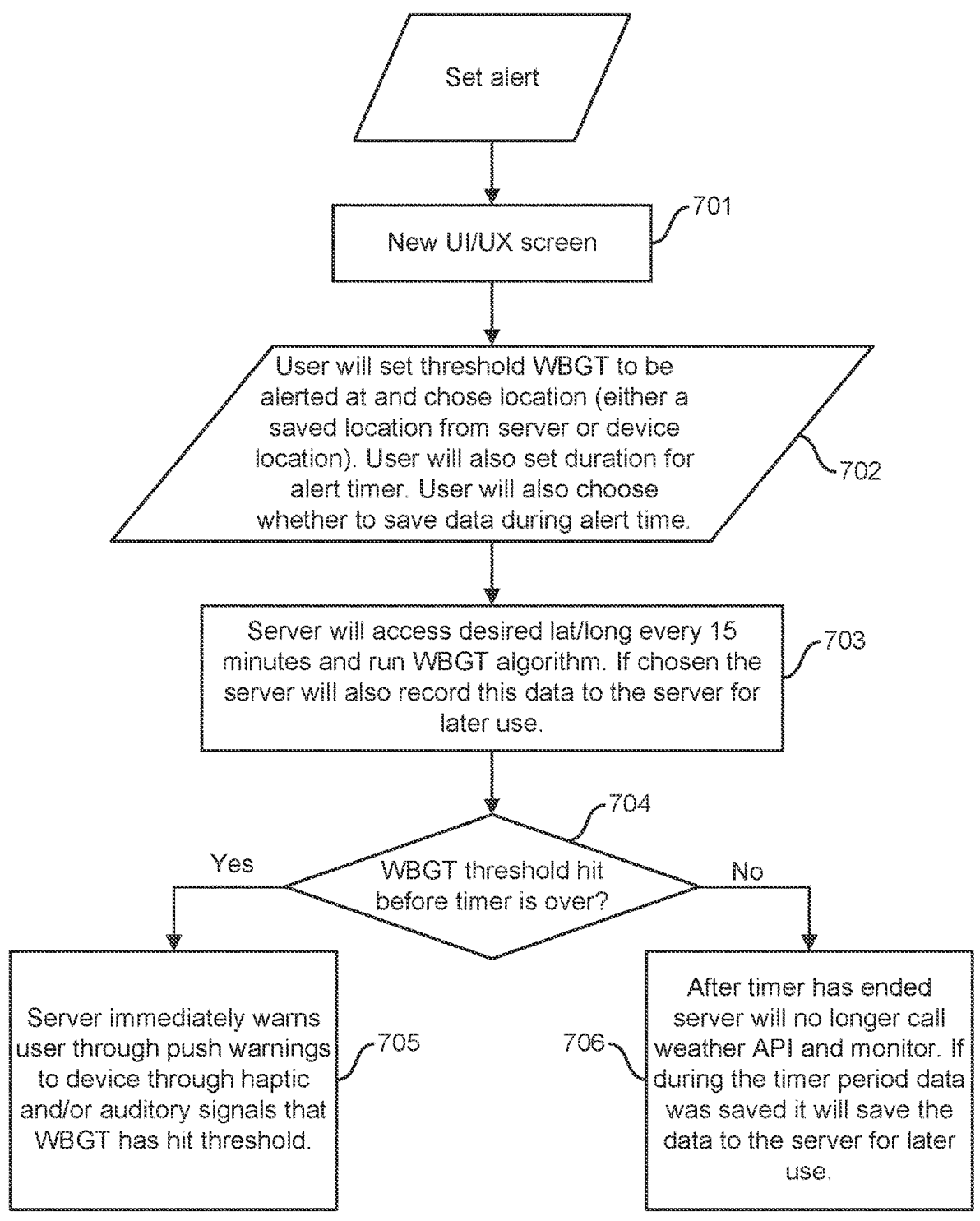
FIG. 7 shows a flowchart for the user selecting a wet bulb globe temperature.
Figure 8:
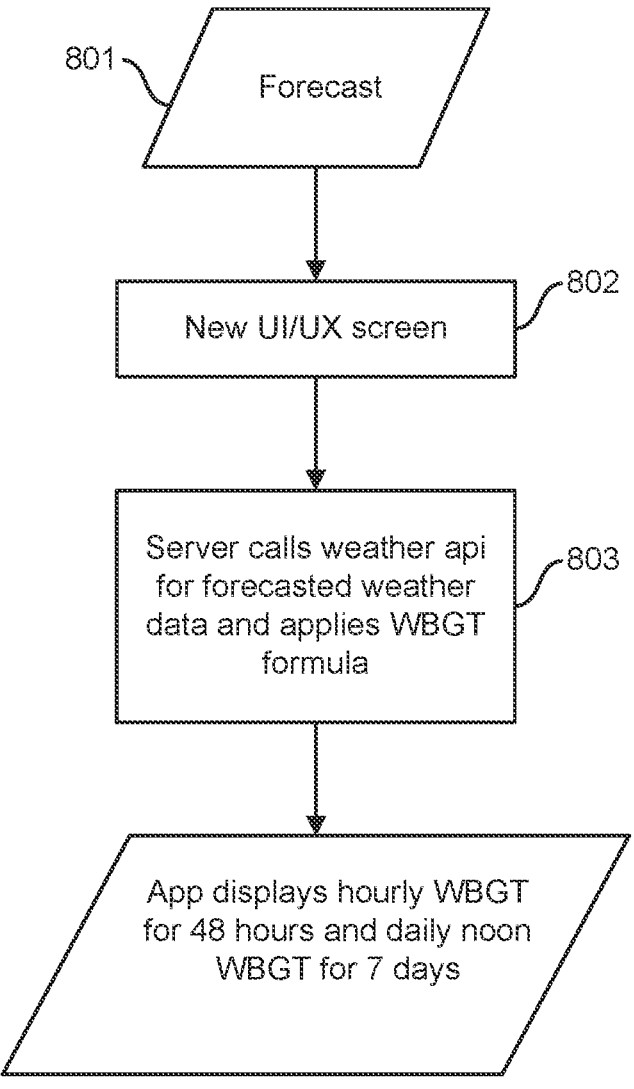
FIG. 8 shows a flowchart for displaying wet bulb globe temperature forecasts.
Figure 9:
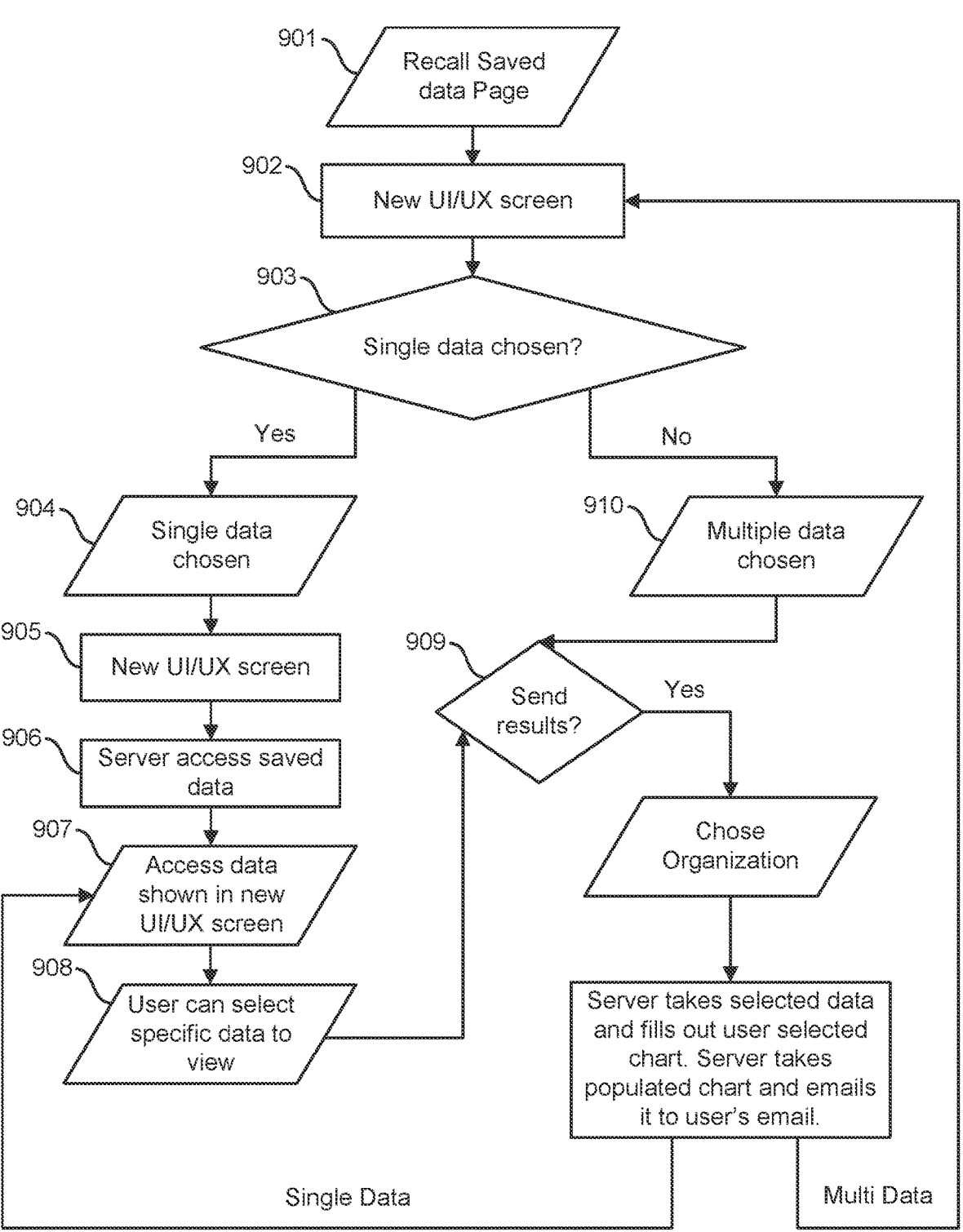
FIG. 9 shows a flowchart for saving weather data.

If the user wants to save the data 409 as illustrated in FIG. 4, then the user will see a new UI/UX screen shown on FIG. 6. Then, the user selects organization and an activity revision 602. A server will then store all data 603. The interface is customizable and the user is the ability to change the layout of the display. UI/UX screens are designed to maximize the user experience.

If the user selects an alert to alert the user or others of dangerous wet bulb globe temperature, then the user will select for such an option 410. A shown in FIG. 7, the user will then see a new UI/UX screen 701 on the interface. The interface will allow the user to set a wet bulb globe temperature limit associated with a specified time 702. The method includes determining the wet bulb globe temperature at a specified time interval 703 such as every 15 minutes. This data may also be saved 409 if so selected by the user.

In another step 704 of the method, the alert module will then determine if the wet bulb globe temperature has been reached for the time specified. If the wet bulb globe temperature has been reached during the specified time, then an alert 705 will be issued. The alert may be in any form known in the art. If the wet bulb globe temperature has not been reached and the time specified has past 706, then the wet bulb globe temperature will not be determined.

This computer implemented method also allows for a user to look at wet bulb globe temperature forecasts if selected by the user. If the user selects forecast 801, the user will see a new UI/UX screen 802. The method will then use forecasted weather data and apply the forecast to determine a wet bulb globe temperature forecast 803.

An important aspect of the invented computer implemented method is that it allows a user to recall saved data. This can be important in research, litigation, or a host of other scenarios. If the user selects recalling saved data 901, then the user will see a new UI/UX screen 902. The user will then have the opportunity to select single data or multiple data 903 on the interface. If the user selects single data 904, then the user will see a new UI/UX screen 905. Saved data will then be accessed 906 by the computer implemented method. The data is then displayed 907 and the user may change the organization 908 of the data. The data may be sent or otherwise transferred 909. If multiple data is selected 910, then that data may be immediately transferred 909.

The device 101 may also include modules that can directly measure any aspect of the weather instead of retrieving the weather data from an external source. For example, the device, which may be a smartphone with an app for caring out the methods described herein, can have external thermometer connected to directly measure temperature. The device could also be configured to directly measure any or all of relative humidity, dew point, wind speed, solar irradiance, zenith angle, barometric pressure, and cloud cover. Zenith angle can also be estimated by the user.

The invention claimed is:

1. A computer implemented system for correlating a wet bulb globe temperature to a user specified location at a user specified time comprising:

a positioning module configured to determine a physical location of a user;

an electronic data feed source of weather data for the physical location or a secondary location;

a processor configured to determine an ambient wet bulb globe temperature for the physical location or the secondary location based on the wet globe temperature, the black globe temperature, and the air temperature;

a user interface module configured to display the ambient wet bulb globe temperature and configured to enable a user to select a wet bulb globe temperature limit and an alert time duration;

a memory module configured to assign a time stamp and a location stamp to the ambient wet bulb globe temperature and to save the ambient wet bulb globe temperature having the time stamp and the location stamp;

a wireless communication module; and an alert module configured to continuously monitor the ambient wet bulb globe temperature during the alert timer duration, and alert the user when the ambient wet bulb globe temperature meets or exceeds the wet bulb globe temperature limit for a preset time interval for a location specified by the user prior to the expiration of the alert timer duration, wherein the alert is a hardware haptic feedback mechanism and an auditory signal generator on a device of the user, to protect one or more athletes from heat stress.

2. The computer implemented system of claim 1, wherein the user interface module is further configured to display a temperature for the physical location.

3. The computer implemented system of claim 1, wherein the processor is further configured to determine a forecasted wet bulb globe temperature for the physical location or the secondary location.

4. The computer implemented system of claim 3, wherein the processor is further configured to determine a historical wet bulb globe temperature for the physical location or the secondary location.

5. The computer implemented system of claim 4, wherein the wireless communication module is configured to send an email to a specified email address, the email including the ambient wet bulb globe temperature having the time stamp and the location stamp.

6. The computer implemented system of claim 5, further comprising a server, wherein the wireless communication module is configured to send the physical location or the secondary location to a remote server, the remote server comprising the processor.

7. The computer implemented system of claim 6, wherein the remote server is configured to receive the weather data.

8. The computer implemented system of claim 7, wherein the weather data is comprised of relative humidity, air temperature, dew point, wind speed, solar irradiance, zenith angle, barometric pressure, and cloud cover.

9. The computer implemented system of claim 8, wherein the weather data is used to determine a wet globe temperature and a black globe temperature, and the wet globe temperature and the black globe temperature are being used to determine the ambient wet bulb globe temperature.

10. The computer implemented system of claim 9, wherein the wet globe temperature, the black globe temperature and the air temperature are the variables used to calculate the ambient wet bulb globe temperature.

11. A system for determining a wet bulb globe temperature comprising:

a portable unit and a remote server, the portable unit comprising a positioning module configured to determine a physical location of a user, a user interface configured to display a wet bulb globe temperature for the physical location and further configured to enable a user to select an alert timer duration, and a wireless communication module configured to communicate with the remove server;

the remote server comprising an electronic data feed source configured to receive weather data for the physical location, a processor configured to determine the wet bulb globe temperature for the physical location based on the wet globe temperature, the black globe temperature, and the air temperature, wherein the processor is further configured to continuously monitor the ambient wet bulb globe temperature during the alert timer duration, and to generate an alert signal when a wet bulb globe temperature limit for a preset time interval is reached prior to the expiration of the alert timer duration to protect one or more users from heat stress, wherein the alert signal communicates with an alert module to generate a hardware haptic feedback mechanism and an auditory signal generator on a device of the user a memory module configured to assign a time stamp and a location stamp to the wet bulb globe temperature and to save the wet bulb globe temperature having the time stamp and the location stamp, and a wireless communication component configured to communicate with the portable unit.

12. The system of claim 11, the portable unit further comprises an alert module configured to generate a sound or vibration alert when the portable unit receives the alert signal from the remote server.

13. The system of claim 12, wherein the user interface includes an alert limit that allows a user to select the wet bulb globe temperature limit.

14. The system of claim 11, wherein the user interface includes a location input configured to enable a user to select a location to be associated with a wet bulb globe temperature.

15. The system of claim 11, wherein the processor determines a wet globe temperature and a black globe temperature based on the weather data, and then determines a wet globe bulb temperature based on the wet globe temperature, the black globe temperature, and the air temperature.

16. The system of claim 15, wherein the weather data is further comprised of a relative humidity, a dew point, a wind speed, a solar irradiance, a zenith angle, a barometric pressure, and a cloud cover.

17. A wet bulb globe temperature device comprising a GPS module configured to establish a location of the device;

a communication module configured to receive a wet bulb globe temperature from a processor, the wet bulb globe temperature further comprising an ambient wet bulb globe temperature and a forecasted wet bulb globe temperature and transmit the location of the device to the processor, a user selected location, and the wet bulb globe temperatures;

wherein the processor is configured to determine the wet bulb globe temperature for the physical location based on the wet globe temperature, the black globe temperature, and the air temperature weather data and the air temperature, wherein the processor is further configured to generate an alert signal when a wet bulb globe temperature limit for a preset time interval is reached to protect one or more users from heat stress;

a customizable user interface configured to receive the wet bulb globe temperature limit for the preset time interval and an alert time duration, display the ambient wet bulb globe temperature, display the forecasted wet bulb globe temperature; and an alert module configured to alert a user when the ambient wet bulb globe temperature equals or is greater than the wet bulb globe temperature limit prior to the expiration of the alert timer duration, wherein the alert is a hardware haptic feedback mechanism and an auditory signal generator on a device of the user.

18. The wet bulb globe temperature device of claim 17, further comprising a component for directly measuring the air temperature.

19. The wet bulb globe temperature device of claim 17, further comprising a selection module that enables the user to select a location from a map interface.

20. The wet bulb globe temperature device of claim 17, further comprising a record component that saves all data for a given time set to an external server.

\* \* \* \* \*